April 18, 1961  L. F. FEHLNER  2,980,052
PARAVANE
Original Filed July 27, 1954  2 Sheets-Sheet 1

INVENTOR
LEO F. FEHLNER

BY

ATTORNEYS

April 18, 1961   L. F. FEHLNER   2,980,052
PARAVANE
Original Filed July 27, 1954   2 Sheets-Sheet 2

INVENTOR
LEO F. FEHLNER
BY
B. L. Zangwill
ATTORNEYS

United States Patent Office 2,980,052
Patented Apr. 18, 1961

2,980,052

PARAVANE

Leo F. Fehlner, 4308 Chestnut St., Bethesda 14, Md.

Original application July 27, 1954, Ser. No. 446,185, now Patent No. 2,960,960, dated Nov. 22, 1960. Divided and this application Oct. 22, 1959, Ser. No. 854,991

8 Claims. (Cl. 114—235)

(Granted under Title 35, U.S. Code (1952), sec. 266)

The invention described herein may be manufactured and used by or for the Government of the United States of America for governmental purposes without the payment of any royalties thereon or therefor.

The present invention relates to improvements in paravanes and more particularly to paravanes having cambered hydrofoils with high lift-to-drag and lift-to-weight ratios, and which maintain an accurate operational depth.

This application is a division of copending parent application Serial No. 446,185, filed July 27, 1954, now Patent No. 2,960,960.

Generally, paravanes have been towed by a towing vessel at a substantial angle rearward from the towpoint on the ship by a cable attached to the paravane body since presently used paravanes have a high inherent drag which causes the paravane to lag appreciably rearward of the towing point. Further, paravanes are usually equipped with a depth control device sensitive to static pressure changes to position the paravane at a specific operational depth. Some of these depth control devices in combination with the conventional paravane construction have caused the paravane to excessively oscillate or "hunt" in the water in finding an equilibrium towing position. This hunting action of the paravane produces dynamic loads which result in undesirable repeated stress on the towing cable, and in an erratic and inefficient manner of towing the device.

The present invention embodies a buoyant or nonbuoyant paravane capable of carrying a cable quickly away from the ship and to be towed therefrom. The paravane utilizes a cambered hydrofoil, hereinafter called a paravane wing. The paravane wing is similar to an aircraft wing and is equipped with horizontal and lateral stabilizing surfaces. The cooperation of the aerodynamically designed cambered paravane wing with the stabilized surfaces causes the paravane to operate nearly abeam of the tow point on the ship, while the depth of the paravane is determined by controlling the attitude of the paravane relative to its direction of travel.

The cambered paravane wing operates in a similar manner as an aircraft wing in a banked attitude, wherein the inclination of the wing may be changed by varying the lift forces over the paravane's cambered surfaces through an induced change in the relative fluid flow pattern thereon through the use of control surfaces, such as flaps, ailerons, elevators, or the like. In conjunction with the paravane wing, a depth control mechanism responsive to hydrostatic pressure is utilized for motivating the action of the control surfaces for differentially varying the fluid flow pattern and, consequently, the lift forces over the wing. The variation of the lift loading on the paravane wing, in response to changes in hydrostatic pressure, will produce corresponding variations in the attitude of the wing which will result in a corresponding change in the depth position of the paravane.

Further, the present invention embodies a paravane wherein the pulling force exerted by the towing vessel of the paravane, through the towline, will not be greatly affected by the drag forces of the paravane, and wherein the normal towing position will accordingly be substantially abeam of the vessel's towing point. The high resultant lift force inherent in the cambered design of the paravane wing will cause said wing to quickly tow-out, instead of being merely dragged along, and to assume the desired operational position at the end of a substantially taut cable.

The paravane wing is attached to the towline through a suitable coupling which will enable the paravane wing to pivot continuously about an axis concentric with the towline and to roll freely about a horizontal axis and pitch freely about an axis perpendicular to both the roll axis and the tow cable, which axes are fixed by operational requirements. Accordingly, the paravane wing will be operative free of any interfering action from the towline and will tend to remain substantially in its chosen equilibrium position, for independent reaction to changes in hydrostatic pressure. The paravane wing is provided with suitable stability surfaces to furnish a dampening and stabilizing effect which will substantially retard any oscillatory movement of said wing about its vertical or horizontal axis. The paravane wing will quickly tend to return to its equilibrium position of operation after any change in its attitude since it is solely responsive to changes in hydrostatic pressure and not to forces transmitted thereto through the attached towline other than tension.

The paravane wing of the immediate invention is provided with longitudinal stability about its towpoint through the provision of the suitable surface contour, or camber, wherein the resultant of all the hydrodynamic forces acting on said wing will pass through its towing point to substantially eliminate any undesirable unbalancing of said wing from its operative attitude and wherein deviations from this attitude result in moments which tend to restore the paravane to its operative attitude. By isolating the paravane wing in the manner heretofore discussed from any deleterious effects of unbalanced loads arising from the interaction of the hydrodynamic forces and the towline loads, the wing will be free to assume its equilibrium position and will be responsive to small changes in hydrostatic pressures. These hydrostatic pressure changes will be translated through a simple mechanism into movement of suitable control surfaces regulating the depth of the paravane.

Hence, a broad object of the present invention is to provide a paravane constructed with suitable cambered hydrofoil sections having a high lift-to-drag ratio.

A further object is the provision of a pressure sensitive device highly responsive to small changes in hydrostatic pressure and having simple translating mechanism for actuating control surfaces which determine the attitude of the paravane in the water through suitable modification of the fluid flow over the paravane's surface.

Another object of the present invention is the provision of a paravane which when towed on the end of a cable assumes an equilibrium position of tow substantially abeam of the towing vessel at a specified depth and continues to remain in this position over a specified speed range.

A further object of the invention is the provision of a paravane having an airplane-type wing and movable control surfaces for controlling the depth of the paravane.

Still another object is to provide a paravane having a high lift-to-weight ratio.

Another object is the provision of a paravane wherein the depth of the paravane during towing is a function of the attitude of the hydrofoil relative to its direction of movement.

An object of the present invention is the provision of a paravane that during towing will have longitudinal stability about its towline attachment point.

Other objects and many of the attendant advantages of this invention will be readily appreciated as the same becomes better understood by reference to the following detailed description when considered in connection with the accompanied drawings in which like reference numerals designate like parts throughout the figures thereof and wherein.

Figure 1:
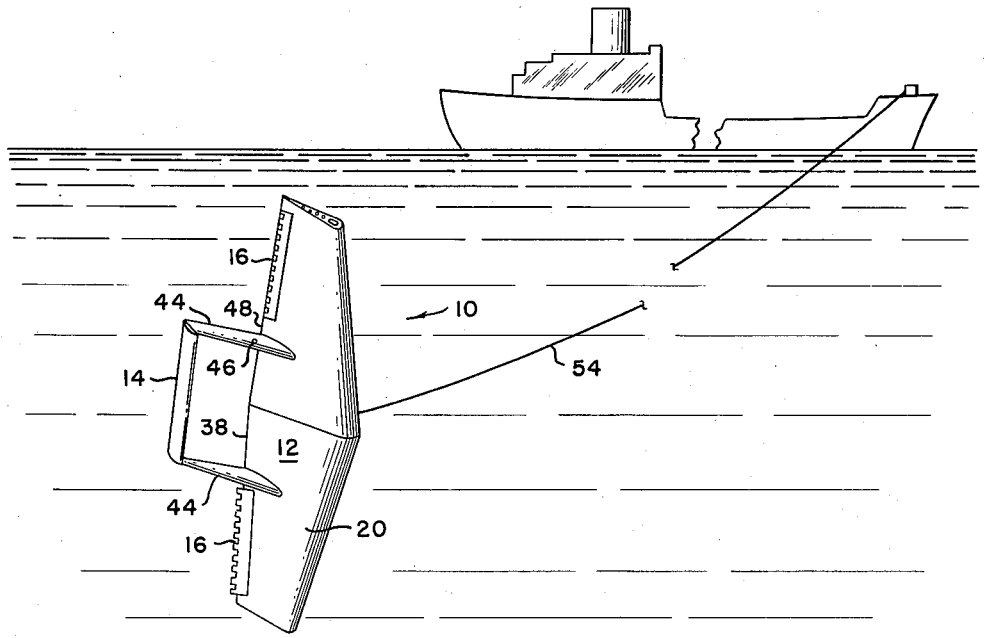
Figure 1 is a perspective view of a preferred embodiment of the invention, in an exaggerated scale for purposes of clarity, showing an airplane-type paravane wing in towing position relative to a towing vessel.

Referring now to the drawings, there is shown in Figure 1 a preferred embodiment 10 of the invention comprising a cambered hydrofoil or paravane wing 12, as referred to hereinafter, with a stability surface 14 and flaps 16 integral with the wing. The flaps 16 are alternately actuated, as shown in the parent application, by a depth controlled mechanism housed within the paravane wing 12 and exposed to the static pressure of the fluid in which it is immersed in a manner herein disclosed. The depth control mechanism includes an adjustable member that causes one or the other of the flaps 16 to operate when the depth of submergence of the paravane deviates from a predetermined depth corresponding to the particular adjustment of the adjustable member.

The paravane wing 12 may be formed in any suitable geometric shape; however, in the preferred embodiment said wing is constructed with a uniform sweepback about its longitudinal axis and with a top and bottom cambered surface, as described in the parent application.

The flaps 16 are connected to the depth control mechanism through flap shafts automatically operated by the depth control mechanism.

The longitudinal stability surface 14 is spaced from the hydrofoil 12 and supported in a fixed relation thereto by supporting struts 44, to thereby remove said surface from the deleterious effect of the slip stream of the fluid flow over the paravane wing so as to provide a measure of longitudinal stability in excess of that provided by the wing 12. The struts 44 are shaped so as to form lateral stability surfaces which provide lateral stability and damping and are hollow in construction and filled with a buoyant material with the exception of conduits for communicating the hydrostaitc pressure from pressure vents 46 provided on their surfaces, to the depth control mechanism. The stability surface 14, also filled with the buoyant material, and its supporting struts 44 are formed with suitable streamlined contours so as to present an efficient hydrodynamic shape to the fluid flow about the paravane wing 12, and to thus minimize any possible interference with the flow over said paravane wing and to minimize the drag. To facilitate maintenance, the paravane's top surface 20 is provided with a number of conventionally constructed accessible covered wells 48 to provide the means for periodical inspections of the flap shafts and of the depth control mechanism.

In the operation of the preferred embodiment 10, the paravane wing 12 is adjusted to operate at a specific depth within certain design limits by the suitable adjustment of the depth control mechanism. The paravane wing is coupled to the tow line 54 by a suitable connection to the tow point of the paravane. The paravane wing is placed in a suitable launcher so that the stability surface 14 is facing away from the towing vessel when launched in its operative position in the water.

In launching the preferred embodiment, the paravane wing 12 is jettisoned or dropped from the towing vessel into the water as far away from the side of the vessel as possible to insure that the paravane does not hit the vessel's side and to give the paravane an initial attitude on leaving the launcher which causes the paravane to enter the surface of the water and quickly tow out into normal operative position.

In the normal operative towed position, the depth of the paravane is determined by controlling the vertical attitude of the paravane wing 12 relative to its direction of travel. The attitude of the wing is controlled by the variation from a predetermined pressure, set by the adjustable member of the depth control mechanism, of the hydrostatic pressure of the water adjacent the pressure taps 46, which is received by the depth control mechanism, to independently and alternately actuate the flaps 16 adjacent the trailing edge 38 of said wing 12 and in addition for large changes in operative depth. The hydrostatic pressure is received through the pressure taps 46, located at a suitable distance from the fluid flow over the paravane wing to escape any pressure disturbances created therefrom, and communicated through passageways provided in the buoyant material within struts 44.

Thus, any change in hydrostatic pressure will cause the paravane to react thereto by a relative change in the banking characteristics of the paravane through a variation in the lift forces over the surface of the paravane wing 12. The variation in lift is produced through a change in the fluid flow pattern over a portion of the paravane wing 12 due to the action of the actuated flap 16 on the path of the fluid flow to reduce the lift and increase the drag over said portion of the paravane wing.

In accordance with the present invention, a paravane is provided that is towed by a cable from a towing vessel, which in operation quickly assumes an equilibrium position of tow substantially abeam of the vessel's towing point, at a specified depth and continues to remain in this position over a specified speed range. Accordingly, a much more stable device for maintaining a cable substantially abeam of the towing ship is provided through the action of the depth control mechanism which prevents hunting, and through the high lift-to-drag design of the paravane wing which is formed with cambered surfaces to provide longitudinal stability about the paravane's tow point.

Figure 3:
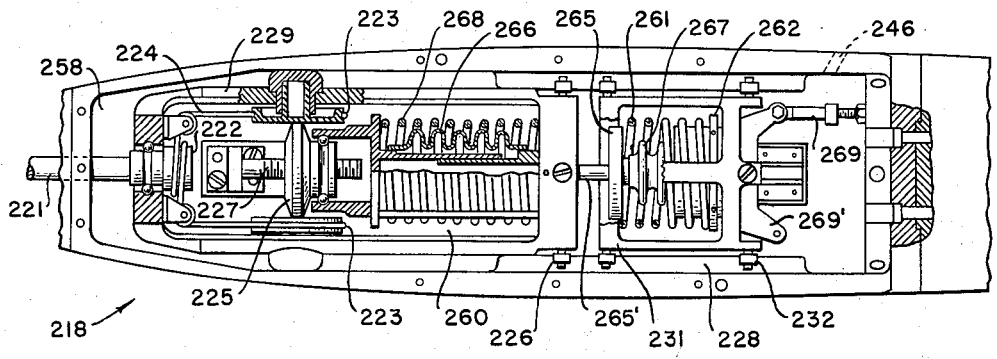
Figure 3 is a sectional view of the hydrostatic pressure actuated mechanism utilized in the embodiment shown in Figure 3, taken on the line III—III of Figure 2, looking in the direction of the arrows.
Figure 2:
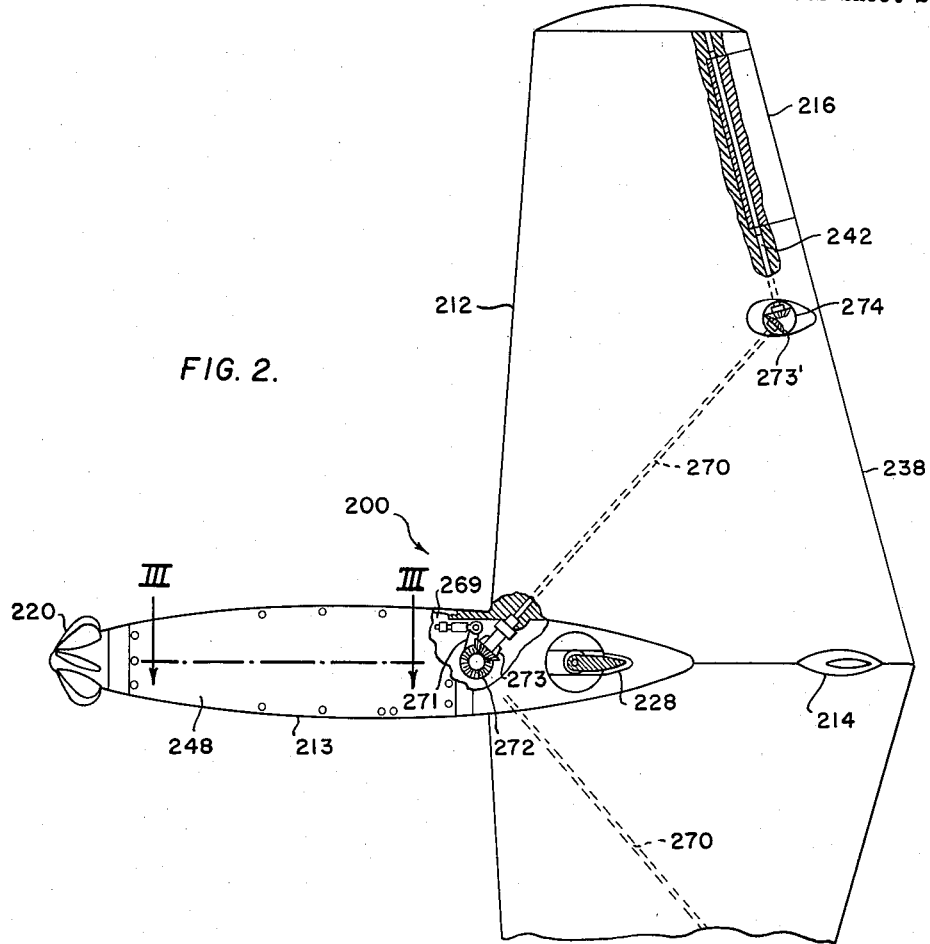
Figure 2 is a plan view, partly in section, of another embodiment of the invention showing an airplane-type wing having aileron-type control surfaces and a streamlined body associated therewith.
Figure 4:
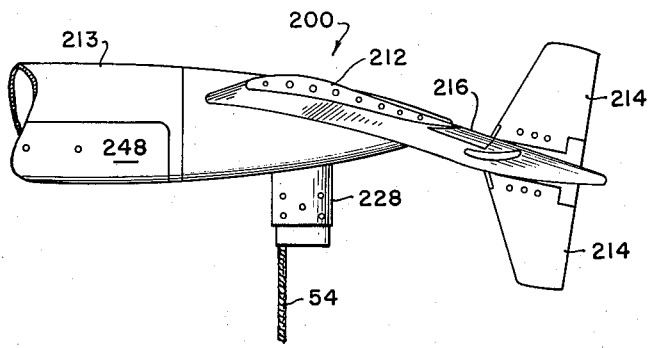
Figure 4 is a partial side view of the embodiment shown in Figure 2 in its operative attitude.

A second modification 200 of the present invention, shown in Figures 2–4, is provided with a cambered paravane wing 212 and a streamlined body 213 integral therewith for mounting therein a depth control mechanism 218. The paravane wing 212 is provided with a stabilizing surface 214 extending perpendicularly through the paravane wing and coinciding with the mutual longitudinal axis of the body 213 and the paravane wing.

The paravane wing is further provided with flaps 216 pivotally mounted within a substantially rectangular cut-out portion along either side of the trailing edge 238. The flaps 216 are pivotally supported on individual flap shafts 242 rotatably mounted within the paravane wing 212 and operatively coupled to the depth control mechanism 218, as hereinafter described. A tow bar 228 is provided pivotally fixed to the body 213, at substantially the fore-aft position of its center of gravity, to form a connection for the towing cable 54, as shown in Figs. 2 and 4.

The depth control mechanism 218 is powered by a fluid driven propeller 220 on a shaft 221 coupled to a first pressure responsive motor, motor 260 having a bellows 266 and a cooperating tension spring 268. The propeller shaft 221 extends into a depth control chamber 258 and is provided with a pulley 222 slidably splined thereon. The pulley 222 is coupled to a pair of diametrically opposed pulley wheels 223 through an endless pulley belt 224 which drives pulleys 223 in opposite directions of rotation. The pulleys 223 are formed with oppositely facing plane surfaces near the centers thereof to frictionally engage a friction disc 225 rotatively fixed to the pressure responsive motor 260 for longitudinal movement therewith. The action of pulley 222 and pulley wheels 223 on friction disc 225 is such that at a predetermined depth, the friction disc contacts the wheels 223 at their centers, and consequently no driving frictional force is applied to disc 125. When the disc is to one or other sides of the center, it will rotate in one direction or the other.

The rotative friction disc 225 is internally threaded to engage a non-rotative threaded shaft 227 fixed to the body 213, for longitudinal displacement relative to the pulley wheels 223. The pulley wheels 223 and the pressure responsive motor 260 are mounted on a movable unitary frame member 229 to operatively coact with pulley 222 for mutual longitudinal movement with respect to the shaft 221 and for relative movement with respect to the body 213 through a plurality of rollers 226 rotatably mounted on said frame member 229. The rollers 226 operate within a U-shaped longitudinal groove 228 integral with the body 213, as shown in Figure 4.

A second pressure responsive device 261 is axially aligned with the unitary frame member 229 for mutual coaction therewith. The pressure responsive device 261 has an end 262 fixed to a longitudinally movable frame member 231 having a plurality of rollers 232 rotatably mounted thereon so as to enable it to roll within the groove 228, and said device 261 has a slidable bellows end 265 fixedly coupled to the frame member 229 by a link 265'. The second pressure responsive device 261 is coupled to a linkage 269 through a coupling member 269' fixed to the frame member 231 for longitudinal movement therewith in response to changes in hydrostatic pressure.

The linkage 269 is pivotally coupled to a bell crank 271, Fig. 2, having an integral bevel gear 272 meshing with a bevel gear 273 fixed to a control shaft 270. The shaft 270 is suitably journaled within the paravane wing and provided with a bevel gear 273' engaging a bevel gear 274 fixed to the flap shaft 242 to provide for the alternate angular displacement of the flaps 216. The pressure responsive device 260 is responsive to the hydrostatic pressure of the fluid entering through a vent 246 formed on the body 213 in a region where super velocities of flow are not to be expected.

Any change in hydrostatic pressure causes the pressure responsive motor 260 to react thereto and move the pulley wheels 223 relative to the rotative friction disc 225. The second pressure responsive device 261 reacts to a change in hydrostatic pressure by longitudinally moving the frame 231 relative to the frame 229 to directly deflect the flaps 216 relative to the position of the frame 229 to produce a correction in depth. Therefore, the reaction of the second pressure responsive device 261 to any hydrostatic pressure change will be additive to the longitudinal reaction of the pressure responsive device 260 so that both cooperate to produce corrective deflections of flaps 216. Thus, the paravane is provided with improved depth keeping characteristics.

In the operation of the second modification 200 of the present invention, the separate pressure responsive devices 261 and 260 provide the deviation signal and the integrated deviation signal. In this manner, devices 260 and 261 are made to cooperate to provide a combined signal which properly actuates the flaps 216 to provide improved depth keeping. As in the preferred embodiment 10, the present modification may be compared to an airplane in a near-vertical bank, wherein the lift is controlled by flattening the bank, or the vertical inclination of the paravane, to increase the vertical lift or vice versa.

The preferred embodiment and the modifications of the present invention are similar in that aerodynamic principles are employed to obtain a high lift paravane wing with an inherent low drag and with a high lift-to-weight ratio for providing a very efficient paravane, which will maintain a towline substantially abeam of the vessel's tow point. The embodiments of the present invention utilize cambered paravane wing surfaces designed according to the non-dimensional coordinates presented herein, and utilize a depth control mechanism responsive to changes in hydrostatic pressure for actuating a mechanism operatively coupled to control surfaces associated with the paravane wing. Suitable actuation of the control surfaces produces a modification of the fluid flow pattern about the paravane which results in a variation of the paravane's lift and drag components which determine its attitude in the water and, consequently, its depth.

Obviously many modifications and variations of the present invention are possible in the light of the above teachings. It is therefore to be understood, that within the scope of the appended claims, the invention may be practiced otherwise than as specifically described.

What is claimed is:

1. A paravane for towing a cable substantially abeam of the vessel's towing point, comprising a cambered hydrofoil having aileron means along its trailing edge, a streamlined body secured to said hydrofoil with its longitudinal axis coincident with the center line of said hydrofoil, a stabilizing means secured to said hydrofoil and having a longitudinal axis perpendicular to the center line of said hydrofoil, a hydrostatic pressure responsive means within said body and having a first pressure responsive device and a second pressure responsive device, said first pressure responsive device having a frame member connected thereto for longitudinal motion relative to said body, said second pressure responsive device being rigidly secured to said frame member and having second means for longitudinal motion relative to said body, and mechanical means coupling said responsive pressure sensitive device to said aileron means for translating hydrostatic pressure changes on said pressure responsive devices into angular movement of said aileron means relative to said cambered hydrofoil.

2. The invention as described in claim 1 but further characterized by said first pressure responsive device having a fluid driven propeller coupled thereto, pulley means rotatively secured to said frame member and driven by said propeller means, a friction wheel rotatably secured to said first pressure responsive means and frictionally engaging said pulley means, said friction disc threadedly engaging a threaded shaft fixed relative to said body and adapted to take up the deflection of said first pressure responsive means to provide an integrated signal.

3. A paravane for towing a cable substantially abeam of the vessel's towing point, comprising a cambered hydrofoil having aileron means along its trailing edge, stabilizing means for said paravane, a streamlined body secured to said hydrofoil and extending forwardly therefrom, a propeller at the forward end of said streamlined body, a hydrostatic pressure responsive means extending inside said body, and having a first movable pressure responsive device and a second movable pressure responsive device, said devices being interconnected, inlet means including an inlet exposed to ambient fluid located relative to said hydrofoil so as to be substantially free of fluid pressure disturbances created by said hydrofoil, said inlet means delivering fluid pressure to said hydrostatic pressure responsive means, means connecting said propeller to said first pressure responsive device for controlling the last said device, and mechanical means coupling said second pressure responsive device to said aileron means, whereby to translate changes in position of said paravane into angular movement of said aileron means relative to said hydrofoil.

4. A paravane for towing a cable substantially abeam of the vessel's towing point, comprising a cambered hydrofoil having aileron means along its trailing edge, stabilizing means for said paravane, a streamlined body secured to said hydrofoil and extending forwardly therefrom, control means in said body for controlling said aileron means.

5. A paravane as defined in claim 4 wherein said control means comprises a movable member movably responsive to the depth of said paravane, and a mechanical connection from said control means to said aileron means for converting movement of said control means into movement of said aileron means.

6. A paravane as defined in claim 5 wherein said mechanical means comprises shaft means inside said hydrofoil.

7. A paravane as defined in claim 5 wherein said movable member is adjustable, and said control means comprises a propeller operable on said movable member.

8. A paravane for carrying a cable substantially abeam from a towing vessel, said paravane comprising a hydrofoil having major surfaces thereof cambered according to given non-dimensional coordinates in a manner as to produce inherently low drag and relatively high lift-to-weight ratio when towed in a normal substantially vertical operative position to thereby maintain the cable substantially abeam of the towing vessel, a streamlined body extending forwardly of the center of the hydrofoil, speed repressive means including a propeller rotatable in accordance with the speed of said paravane, flow control means for controllably modifying the fluid flow pattern about the cambered surfaces of said hydrofoil, said fluid control means comprising aileron means at edges of said hydrofoil, and depth control mechanism responsive to changes in speed of said propeller and operatively coupled to said flow control means for controlling said flow control means.

References Cited in the file of this patent
UNITED STATES PATENTS

| | | |
|---|---|---|
| 1,358,358 | Burney | Nov. 9, 1920 |
| 2,572,442 | Burnelli | Oct. 23, 1921 |
| 2,681,773 | Rethorst | June 22, 1954 |